(12) United States Patent
Shenfield et al.

(10) Patent No.: US 7,756,905 B2
(45) Date of Patent: Jul. 13, 2010

(54) SYSTEM AND METHOD FOR BUILDING MIXED MODE EXECUTION ENVIRONMENT FOR COMPONENT APPLICATIONS

(75) Inventors: Michael Shenfield, Richmond Hill (CA); Brindusa Fritsch, Toronto (CA); Kamen Vitanov, Mississauga (CA)

(73) Assignee: Research In Motion Limited, Waterloo, ON (CA)

( * ) Notice: Subject to any disclaimer, the term of this patent is extended or adjusted under 35 U.S.C. 154(b) by 464 days.

(21) Appl. No.: 11/066,239

(22) Filed: Feb. 25, 2005

(65) Prior Publication Data

US 2005/0192984 A1 Sep. 1, 2005

Related U.S. Application Data

(60) Provisional application No. 60/548,098, filed on Feb. 27, 2004.

(51) Int. Cl.
*G06F 17/30* (2006.01)
(52) U.S. Cl. .......................... 707/803; 717/120; 717/140
(58) Field of Classification Search ........................ None
See application file for complete search history.

(56) References Cited

U.S. PATENT DOCUMENTS

| | | | |
|---|---|---|---|
| 6,477,439 B1 * | 11/2002 | Bernaden et al. | 707/103 R |
| 6,571,285 B1 * | 5/2003 | Groath et al. | 709/223 |
| 6,763,226 B1 * | 7/2004 | McZeal, Jr. | 455/90.2 |
| 6,985,901 B1 * | 1/2006 | Sachse et al. | 707/10 |
| 7,409,674 B2 * | 8/2008 | Shenfield et al. | 717/114 |
| 2002/0129129 A1 | 9/2002 | Bloch | |
| 2003/0200349 A1 | 10/2003 | Hansen | |
| 2004/0015564 A1 * | 1/2004 | Williams | 709/219 |
| 2004/0117804 A1 * | 6/2004 | Scahill et al. | 719/320 |

(Continued)

FOREIGN PATENT DOCUMENTS

WO WO 0109715 2/2001

(Continued)

OTHER PUBLICATIONS

Handspring, "Treo 270 Communicator User's Guide GPRS 1.1, Windows Edition", Dec. 31, 2002 (c), p. 1, 7, 14-15, 35, 39, 41, 44-45, 51, 59, 85, 102, 136, 190-191, 193.*

(Continued)

*Primary Examiner*—Khanh B Pham

(57) ABSTRACT

A device runtime environment is provided for execution on a computing device. The device runtime environment provides an intelligent container for an application at runtime and comprises a plurality of services in communication with each other. The plurality of services a data manager, a screen manager, a communication service and a script interpreter. The data manager manages data components of the application including manipulation and persistence in a database of the data components. The screen manager managing screen components of the application and renders an output for display on a screen of the computing device. The communication service sends messages to external resources and receives and manages messages sent from external resources in accordance with corresponding message components. The script interpreter dynamically interprets script embedded in at least one of the data components, screen components, and message components and relays the interpreted output to the corresponding component manager for implementation. A method for implementing an application on the device in accordance with the above and a computer readable memory for storing instruction to implement the method are also provided.

3 Claims, 15 Drawing Sheets

U.S. PATENT DOCUMENTS

| | | | |
|---|---|---|---|
| 2004/0199614 A1* | 10/2004 | Shenfield et al. | 709/220 |
| 2004/0215700 A1* | 10/2004 | Shenfield et al. | 709/201 |
| 2004/0220998 A1* | 11/2004 | Shenfield et al. | 709/201 |
| 2005/0108682 A1* | 5/2005 | Piehler et al. | 717/110 |
| 2005/0187895 A1* | 8/2005 | Paya et al. | 707/1 |
| 2006/0095331 A1* | 5/2006 | O'Malley et al. | 705/22 |

FOREIGN PATENT DOCUMENTS

| | | |
|---|---|---|
| WO | WO 0246916 | 6/2002 |

OTHER PUBLICATIONS

Handspring, "Treo 270 Communicator User's Guide GPRS 1.1, Windows Edition", Modified Mar. 18, 2003, p. 1-255.*

Handspring, "Treo 270 Communicator User's Guide GPRS 1.1, Windows Edition", Dec 31, 2002(copyright), p. 1-255.*

Turei, "Computer-cellphone pushes all the right buttons; Treo 270", Sep. 19, 2002, The Press, 2nd Ed., Christchurch, New Zealand, p. C7, <Retrieved from Proquest Mar. 20, 2009>.*

Rhodes et al, Palm OS Programming: The Developer's Guide, Jan. 2002, O'Reilly Press, 2nd Ed, 2nd printing, pp. FrontCover, [M], 120-128, 459-461, 670, back cover, <Retrieved from EIC 2100 on Mar. 22, 2009>.*

M. Brown, "Better Vision with The Treo 270 ; Were you intrigued by the Treo 180, Handspring's first PDA/phone combo, but didn't buy one because you wanted more usability?", Sep. 2002, PC Magazine, ProQuest, p. 1-2, <Retrieved from ProQuest Mar. 22, 2009>.*

Vuorimaa et al, "A Java Based XML Browser for Consumer Devices", Mar. 2002, ACM SAC 2002, Madrid, Spain, p. 1094-1099, <Retrieved from ACM Portal Mar. 22, 2009>.*

Notification of Transmittal of the International Search Report and The Written Opinion of the International Searching Authority, or the Declaration for International Patent Application No. PCT/CA2005/000280, May 13, 2005, 11 pages, International Searching Authority.

Supplementary European Search Report issued by the European Patent Office dated Feb. 20, 2008 for corresponding European Patent Application No. 05714522.9.

Kastner, W. et al, "A new approach for Java in embedded networks", Sep. 6, 2000, the whole document.

Examination Report issued by the European Patent Office dated Apr. 22, 2008 for corresponding European Patent Application No. 05714522.9.

Office Action issued by the Canadian Intellectual Property Office dated Feb. 26, 2008 for corresponding Canadian Patent Application No. 2557111.

Office Action issued by the Chinese Patent Office dated Jul. 6, 2007 for corresponding Chinese Patent Application No. 200580006069.4 (English translation).

Examination Report issued by the European Patent Office dated Dec. 5, 2009 for corresponding European Patent Application No. 05714522.9.

Office Action issued by the Intellectual Property Office of India dated Apr. 24, 2009 for corresponding Indian Patent Application No. 4745/DELNP/2006.

* cited by examiner

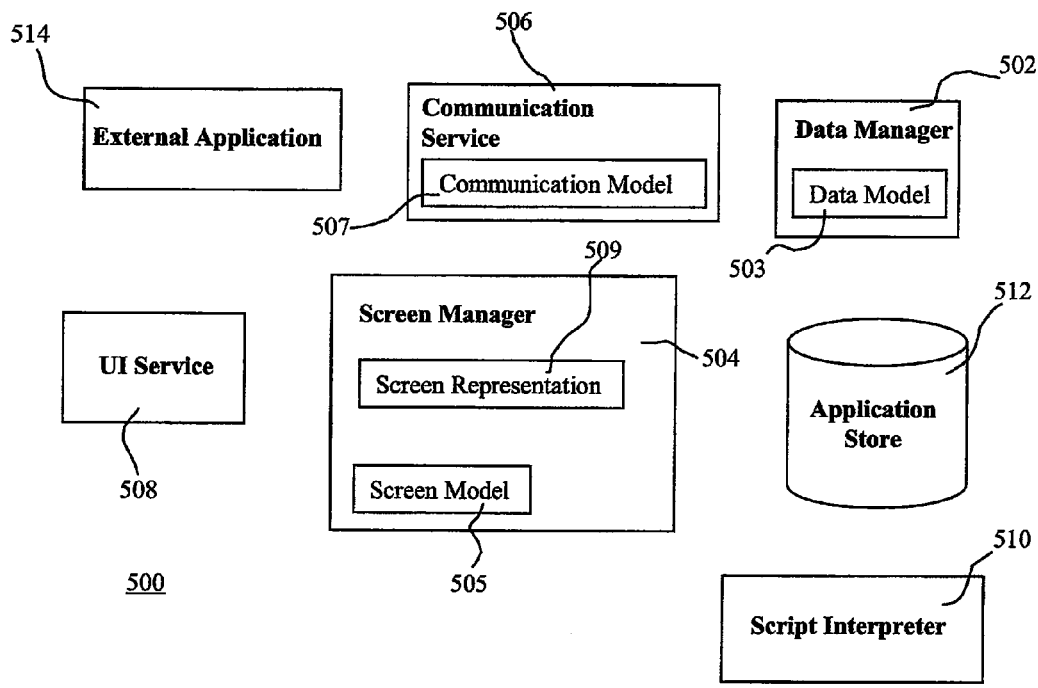

Figure 5

XML:
```
<dataCmp name="Race" persisted="true">
    <field name="code" type="number" key="1" array="false" cmp="false"/>
    <field name="description" type="String" array="false" cmp="false" key="0"/>
    <field name="horses" array="true" cmp="true" cmpName="Horse" type="Any" key="0"/>
    <field name="acceptBets" type="Boolean" array="false" cmp="false" key="0"/>
    <field name="minBet" type="Number" array="false" cmp="false" key="0"/>
    <field name="winner" type="String" array="false" cmp="false" key="0"/>
</dataCmp>
```
↖ 600

Figure 6

XML:
```
<screenCmp name="scrLogin" title="Login" param="Player" dialog="false">
    <layout type="vertical" style="MAIN_APPSTYLE">
        <layout type="flow">
            <label name="ebPlayerNameLbl" value="Player Name: "/>
            <edit name="ebPlayerName" value="@Player.name@"
            readOnly="false" type="char">
        </layout>
        <layout type="flow">
            <label name="ebPlayerCodeLbl" value="Code: "/>
            <edit name="ebPlayerCode" value="@Player.code@"
            readOnly="false" type="char"/>
        <layout>
    </layout>
    <menu>
        <item name="regPlayer" label="Register New Player">
            <action screen="scrRegisterNewPlayer"
            acceptChanges="true">
        </item>
        <item name="loginPlayer" label="Login">
            <action pblock="2" acceptChanges="true"/>
            <condition pblock="1" result="true"/>
        <item>
        <item name="logout" label="Logout">
            <action pblock="3" acceptChanges="true"/>
            <condition pblock="27" result="true"/>
        <item>
    </menu>
</screenCmp>
```
↘ 700

Figure 7

```
<wcMsg name="inViewingReq" pblock="mhViewingReq">
    <mfield name="requestor" mapping="Agent.name"/>
    <mfield name="propID" mapping="MyListing.propID"/>
    <mfield name="date" type="Date"/>
</wcMsg>
```
↘ 800

Figure 8

```
<choice name="chClients" value="@Client[].name@" type="radio" mapping="Client">
    <condition pblock="chAnyClients"/>
</choice>
```
↘ 900

Figure 9a

XML:
```xml
<screenCmp name="scrLogin" title="Login" param="Player" dialog="false">
    <layout type="vertical" style="MAIN_APPSTYLE">
        <layout type="flow">
            <label name="ebPlayerNameLbl" value="Player Name: "/>
            <edit name="ebPlayerName" value="@Player.name@"
                readOnly="false" type="char"/>
        </layout>
        <layout type="flow">
            <label name="ebPlayerCodeLbl" value="Code: "/>
            <edit name="ebPlayerCode" value="@Player.code@"
                readOnly="false" type="char"/>
        </layout>
    </layout>
    <menu>
        <item name="regPlayer" label="Register New Player">
            <action screen="scrRegisterNewPlayer"
                acceptChanges="true"/>
        </item>
        <item name="loginPlayer" label="Login">
            <action pblock="2" acceptChanges="true"/>
            <condition pblock="1" result="true"/>
        </item>
        <item name="logout" label="Logout">
            <action pblock="3" acceptChanges="true"/>
            <condition pblock="27" result="true"/>
        </item>
    </menu>
</screenCmp>
```

XML:
```xml
<wcMsg name="inPropertyinfo" mapping="Propertyinfo"/>
```

XML:

```
<layout>
    <label>Country</ label>
    <choice name="choiceCountry">"Canada", "USA"</choice>
    <layout condition="choiceCountry" value="Canada">
        <label name="provinces">Provinces:</label>
        <choice name="choiceCanadaProvinces">"BRITISH COLUMBIA", "YUKON",
            "NORTHWEST TERRITORIES", "ALBERTA", "SASKATCHEWAN", "NANAVUT",
            "MANITOBA", "ONTARIO", "QUEBEC", "NEWFOUNDLAND", "NEW
            BRUNSWICK", "NOVA SCOTIA"</choice>
    </layout>
    <layout condition="choiceCountry" value="USA">
        <label name="states">States:</label>
            <choice name="choiceUSStates">"ALABAMA", "ALASKA", "ARIZONA",
            "ARKANSAS", "CALIFORNIA", "COLORADO", "CONNECTICUT",
            "DELAWARE", "D.C.", "FLORIDA", "GEORGIA", "HAWAII", "IDAHO",
            "ILLINOIS", "INDIANA", "IOWA", "KANSAS", "KENTUCKY", "LOUISIANA",
            "MAINE", "MARYLAND", "MASSACHUSETTS", "MICHIGAN", "MINNESOTA",
            "MISSISSIPPI", "MISSOURI", "MONTANA", "NEBRASKA", "NEVADA", "NEW
            HAMPSHIRE", "NEW JERSEY", "NEW MEXICO", "NEW YORK", "NORTH
            CAROLINA", "NORTH DAKOTA", "OHIO", "OKLAHOMA", "OREGON",
            "PENNSYLVANIA" "RHODE ISLAND" "SOUTH CAROLINA" "SOUTH DAKOTA",
            "TENNESSEE", "TEXAS", "UTAH", "VERMONT", "VIRGINIA", "WASHINGTON",
            "WEST VIRGINIA", "WISCONSIN", "WYOMING"</choice>
    </layout>
</layout>
```

```
<layout type="vertical" placement=1.0">
        <button name="btnCPrefs" value=Client Details">
                <condition pblock="chAnyClients"/>
                <event type="onClick" screen=scrClientinfo" param="Client"/>
        </button>
        <button name="btnCWrbk" value="Client Workbook">
                <condition pblock="chAnyClients"/>
                <event type="onClick" screen="scrClientWrbk" pram="Client"/>
        <button>
        <button name="btnNewclient" value="New Client">
                <event type="onClick" screen="scrNewClient"/>
        <button>
</layout>
```

XML:

```
<wcMsg name="inMyListing" mapping="PropertyInfo" pblock="mInMyListing"/>
<!—Listing of interest for registered client (pushed on outRegClientSearch or after
outPropertyStatusChange from "pending" to "new"->
<wcMsg name="inListingForClient" mapping="PropertyInfo" pblock="mhListingForClient">
        <mfield name="forClient" mapping="Client.name"/>

<wcMsg>
```

XML:

```
<wcScr name="scrPropDetails" title="Property Details" param="PropertyInfo">
    <!--...-->
    <refresh>
           <msg>inPropertyInfo</msg>
           <msg>inPropertyStatusChange</msg>
    </refresh>
<</wcScr>
```

XML:

```
<pblock name="ahStatusChange" param="propertyInfo">
    outPropertyStatusChange.propID=propertyInfo.propID:
    outPropertyStatusChange.status=propertyInfo.status:
    outPropertyStatusChange.price=propertyInfo.price:
    outPropertyStatusChange.send():
    scrPropDetails.display(propertyInfo):
</pblock>
```

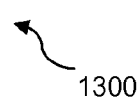

XML:

```
<pblock name="ihInitPlaceBet" param="race, horse, bet">
scrPlaceBet.tbTrack = race.trackLocation;
if(bet != null) {
    scrPlaceBet.tbBetId = bet.id:
    scrPlaceBet.tbRace = bet.raceCode:
    scrPlaceBet.ebHorse = bet.horse:
    scrPlaceBet.ebBetValue = bet.value:
} else {
    scrPlaceBet.tbRace = race.code:
    scrPlaceBet.ebHorse = horse.name:
}
</pblock>
```

XML:

```
<pblock name="mhViewingReq" param="agent, myListing">
    Realtor.viewingDate = InViewingReq.date:
    if(myListing.propInfo !=null) {
        propInfo = myListing.propInfo:
    scrViewingRequested.display(propInfo. agent):
    } else {
    displayMsg = inViewingReq.requestor + "has requested viewing" +
        "of a property which is not in your current listings:" +
        InViewingReq.propID:

Dialog.display(displayMsg):
    }
</pblock>
```

SYSTEM AND METHOD FOR BUILDING MIXED MODE EXECUTION ENVIRONMENT FOR COMPONENT APPLICATIONS

The present invention relates generally to runtime environments and specifically to runtime environments capable of operating in both executable mode and interpreted mode. This application claims priority from U.S. Provisional Application No. 60/548,098, filed Feb. 27, 2004.

BACKGROUND OF THE INVENTION

Due to the proliferation of wireless networks, there are a continually increasing number of wireless devices in use today. These devices include mobile telephones, personal digital assistance (PDAs) with wireless communication capabilities, two-way pagers and the like. Concurrently with the increased availability of wireless devices, software applications running on such devices have increased their utility. For example, the wireless device may include an application that retrieves a weather report for a list of desired cities or allows a user to shop for groceries. These software applications take advantage of the ability to transmit data to a wireless network in order to provide timely and useful services to users, often in addition to voice communication. However, due to the number of different types of devices, the limited available resources of some devices, and the complexity of delivering large amounts of data to the devices, developing software applications remains a difficult and time-consuming task.

Currently, devices are configured to communicate with Web Services through Internet based browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of browsers is the fact that the screens are rendered at runtime, which can be resource intensive. However, applications for browsers are efficient tools for designing platform independent applications. Accordingly, different runtime environments, regardless of the platform, execute the same application. Unfortunately, since different wireless devices have different capabilities and form factors, the application may not be executed or displayed as desired. Further, browser based application often require significant transfer bandwidth to operate efficiently, which may be costly or even unavailable for some wireless devices.

On the other hand, native applications are developed for a specific wireless device platform, thereby providing a relatively optimized application program for a runtime environment running on that platform. However, a platform dependent application introduces several drawbacks, including having to develop multiple versions of the same application and being relatively large in size, thereby taxing memory resources of the wireless device. Further, application developers need experience with programming languages such as JAVA (Java™) and C++ to construct such native applications.

Thus it can be seen that there is a need for application programs that can be run on client devices having a wide variety of operating systems, as well as having a reduced consumption of device resources. Furthermore, it is desirable to achieve the aforementioned result while limiting the complexity for application program developers as much as possible.

Accordingly, it is an object of the present invention to obviate or mitigate at least some of the above-mentioned disadvantages.

SUMMARY OF THE INVENTION

In accordance with an aspect of the present invention there is provided a device runtime environment for execution on a computing device, the device runtime environment for providing an intelligent container for an application at runtime, the device runtime environment comprising a plurality of services in communication with each other, the plurality of services including: a data manager for managing data components of the application including manipulation and persistence in a database of the data components; a screen manager for managing screen components of the application and rendering an output for display on a screen of the computing device; a communication service for sending messages to external resources and receiving and managing messages sent from external resources in accordance with corresponding message components; and a script interpreter for dynamically interpreting script embedded in at least one of the data components, screen components, and message components and relaying the interpreted output to the corresponding component manager for implementation.

In accordance with another aspect of the invention there is provided a method for executing an application on a computing device, the application comprising at least a screen component, a data component, a message component and a workflow component, the method comprising creating an executable form of the application from the screen, data, message, and workflow components for execution by a screen manager, data manager, and message manager respectively; for information from a workflow component that could not be put into executable form before executing the application, dynamically interpreting the information during execution of the application using a script interpreter; and distributing output from the script interpreter to a corresponding screen manager, data manager and message manager.

BRIEF DESCRIPTION OF THE DRAWINGS

An embodiment of the invention will now be described by way of example only with reference to the following drawings in which:

FIG. 5 is a block diagram of a sample runtime environment;

FIGS. 6 to 16 are sample XML definition of various components of an application.

DETAILED DESCRIPTION OF THE PREFERRED EMBODIMENTS

Figure 1:
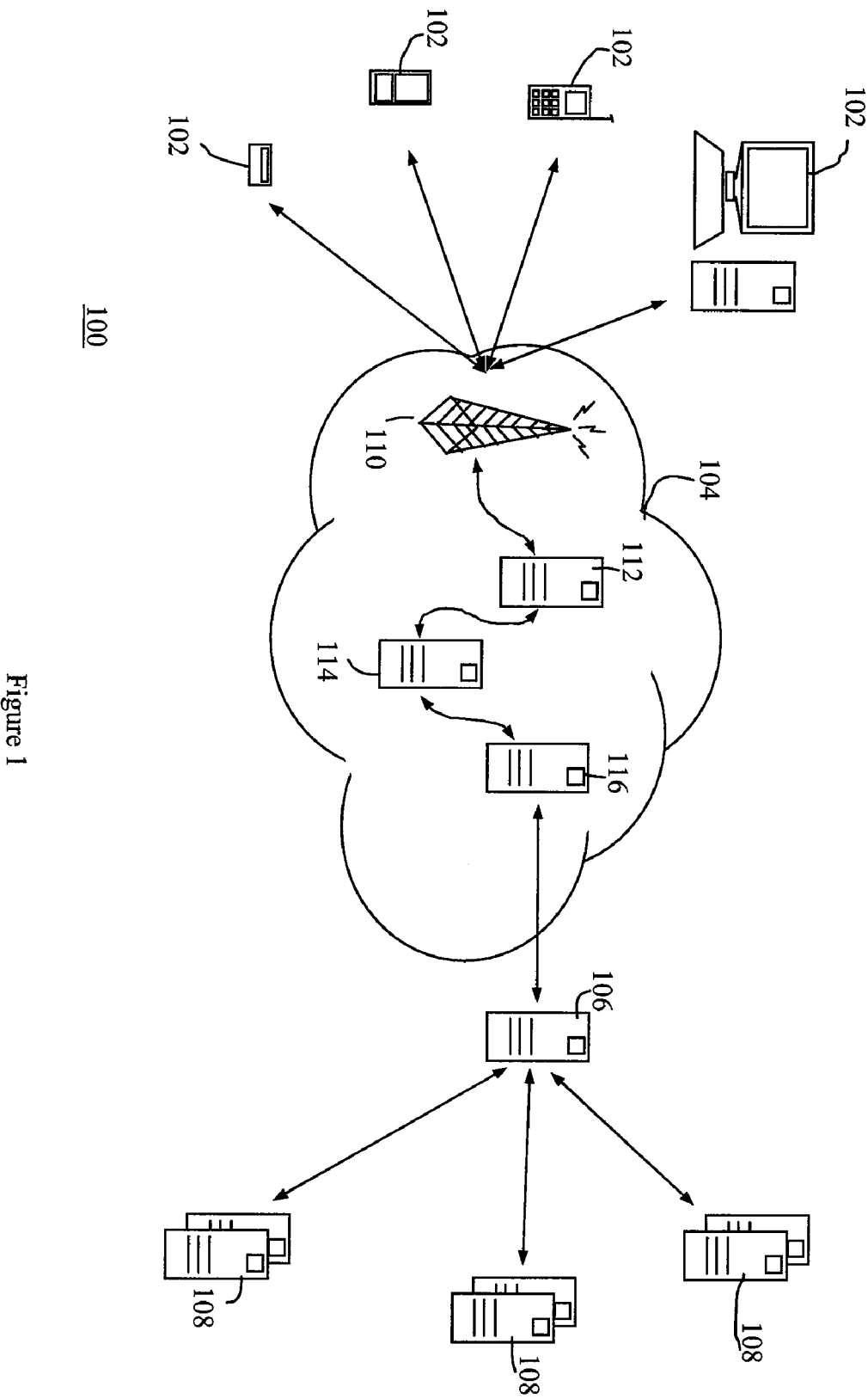
FIG. 1 is a block diagram of a communication infrastructure.

For convenience, like numerals in the description refer to like structures in the drawings. Referring to FIG. 1, a communication infrastructure is illustrated generally by numeral 100. The communication infrastructure 100 comprises a plurality of communication devices 102, a communication network 104, a gateway 106, and a plurality of backend services 108.

The communication devices 102 include any wired or wireless device such as a desktop computer, a laptop or mobile computer, a smart phone, a personal digital assistant, such as a BLACKBERRY (Blackberry™) by Research in Motion for example, and the like. The communication devices 102 are in communication with the gateway 106 via the communication network 104. Accordingly, the communication network 104 may include several components such as a wireless network 110, a relay 112, a corporate server 114 and/or a mobile data server (MDS) 116 for relaying messages between the devices 102 and the gateway 106. The gateway 106 is further in communication with a plurality of the backend servers 108. The types of backend servers 108 and their corresponding links will be apparent to a person of ordinary skill in the art.

Wireless application technologies need to provide means for user interaction, communication with other wired or wireless applications and data storage in the context of usually limited computing resources such as speed, power, memory, storage as well as intermittent connectivity. These limitations provide great challenges for the development of real-world, useful applications.

A desirable approach for reducing application development complexity is to define those components that individualize an application in a declarative way. Examples of such components include user interface, data and communication models. The components are presented to an intelligent container, such as the device runtime environment, as contracts and the complex but otherwise common tasks are delegated to the intelligent container to solve.

The following describes a system by which the intelligent container offers a native execution environment for applications defined by means of metadata and scripting languages. Accordingly, the burden that constitutes the wireless environment complexity is shifted from the application to the intelligent container. Thus, the only complexity that the application writer is left to solve is to clearly define a contract between the application and the intelligent container in order to ensure the desired functionality.

Figure 2:
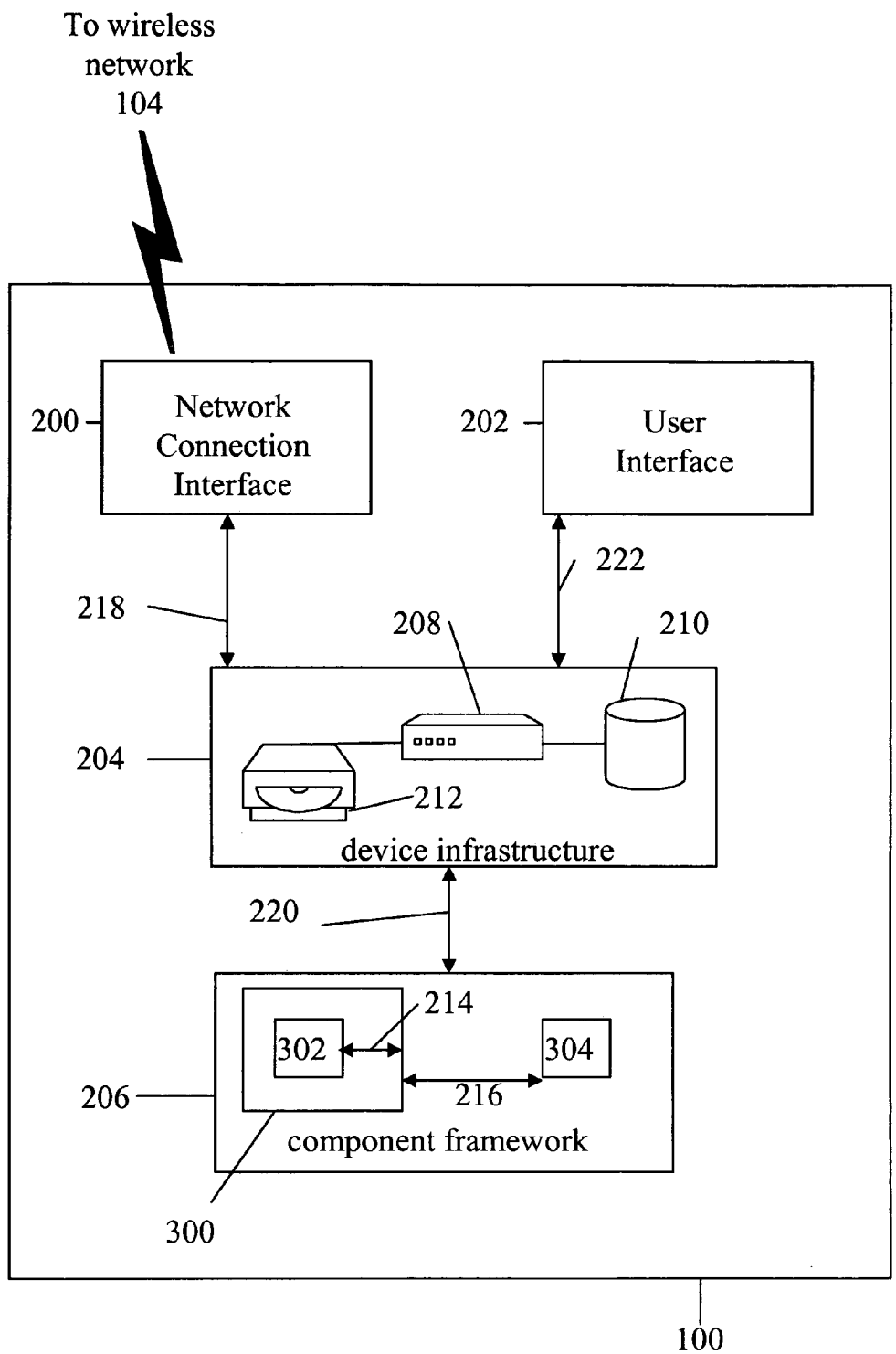
FIG. 2 is a block diagram of a wireless device.

Referring to FIG. 2, the communication devices 102 (also referred to simply as devices 102) are illustrated in greater detail. The devices 102 include a network interface 200, a user interface 202, a core infrastructure 204, and a component framework 206. The network interface 200 comprises a wireless transceiver or a wired network interface card or modem, for coupling the device 102 to the network 104. For example, the network interface 200 communicates with the wireless network 104 using either known or proprietary protocols. This feature enables the devices 102 to communicate wirelessly with each other as well as external systems, such as the network server 106. The network 104 supports the transmission of data in the form request and response messages between devices and the backend servers 108. Further, the network 104 may support voice communication for telephone calls between the devices 102 as well as devices external to the network 104.

The user interface 202 comprises one or more means for communicating with the user (not shown). For example, the user interface 202 includes one or more input devices such as a keypad, trackwheel, stylus, mouse, and microphone for receiving input from the user and one or more output devices such as a display and speaker for presenting output to the user. If the display is touch sensitive, then the display can also be used as an input device. The user interface 202 is employed by the user of the device 102 to coordinate request and response messages of client application programs 201.

The core infrastructure 204 includes a computer processor 208 and an associated memory module 210. The computer processor 208 manipulates the operation of the network interface 200, the user interface 202 and the component framework 206 of the communication device 116 by executing related instructions, which are provided by an operating system and client application programs (not shown) stored in the memory module 210. Further, it is recognized that the device infrastructure 204 may further include a computer readable storage medium 212 for providing instructions to the processor or loading or updating client application programs to the memory module 210. The computer readable medium 212 may include floppy disks, magnetic tape, optically readable media such as compact discs and digital video discs, memory cards and the like.

The component framework 206 comprises a runtime environment 216 that is capable of generating, hosting and executing client application programs from metadata definitions. Therefore, the component framework 206 provides the native client runtime environment 216 for the client application programs and acts as an interface to the processor 208 and associated operating system of the core infrastructure 204. The component framework 206 provides the runtime environment 216 by supplying at least the minimum requirements for a controlled, secure and stable environment on the device 100, in which the component application programs can be executed. The requirements for the runtime environment will be described throughout the description.

The runtime environment 216 can be configured so that the devices 102 operate as web clients of the web services provided by the network server 106. It is recognized that the runtime environment 216 can also make the devices 102 clients of any other generic schema-defined services supplied by the server 108. The runtime environment 216 is capable of generating, hosting and executing the application programs. Further, specific functions of the client runtime environment include support for different languages, coordination of memory allocation, networking, management of data during input/output (I/O) operations, coordination of graphics to an output device, and providing access to core object oriented classes and supporting files/libraries. Examples of environments on which the runtime environments 216 can be based include Common Language Runtime (CLR) by Microsoft and Java Runtime Environment (JRE) by Sun Microsystems.

The runtime environment 216 preferably supports the following functions for executable versions of the client application programs: provide communications capability for sending messages to the web services of the network server 106 or to any other generic schema defined services via the network 104; allow data input from the user via the input device; provide data presentation or output capabilities for displaying data to the user via the output device; provide data storage services to maintain and manipulate data in the memory module 210; and provide a script interpreter for executing scripts when required.

Figure 3:
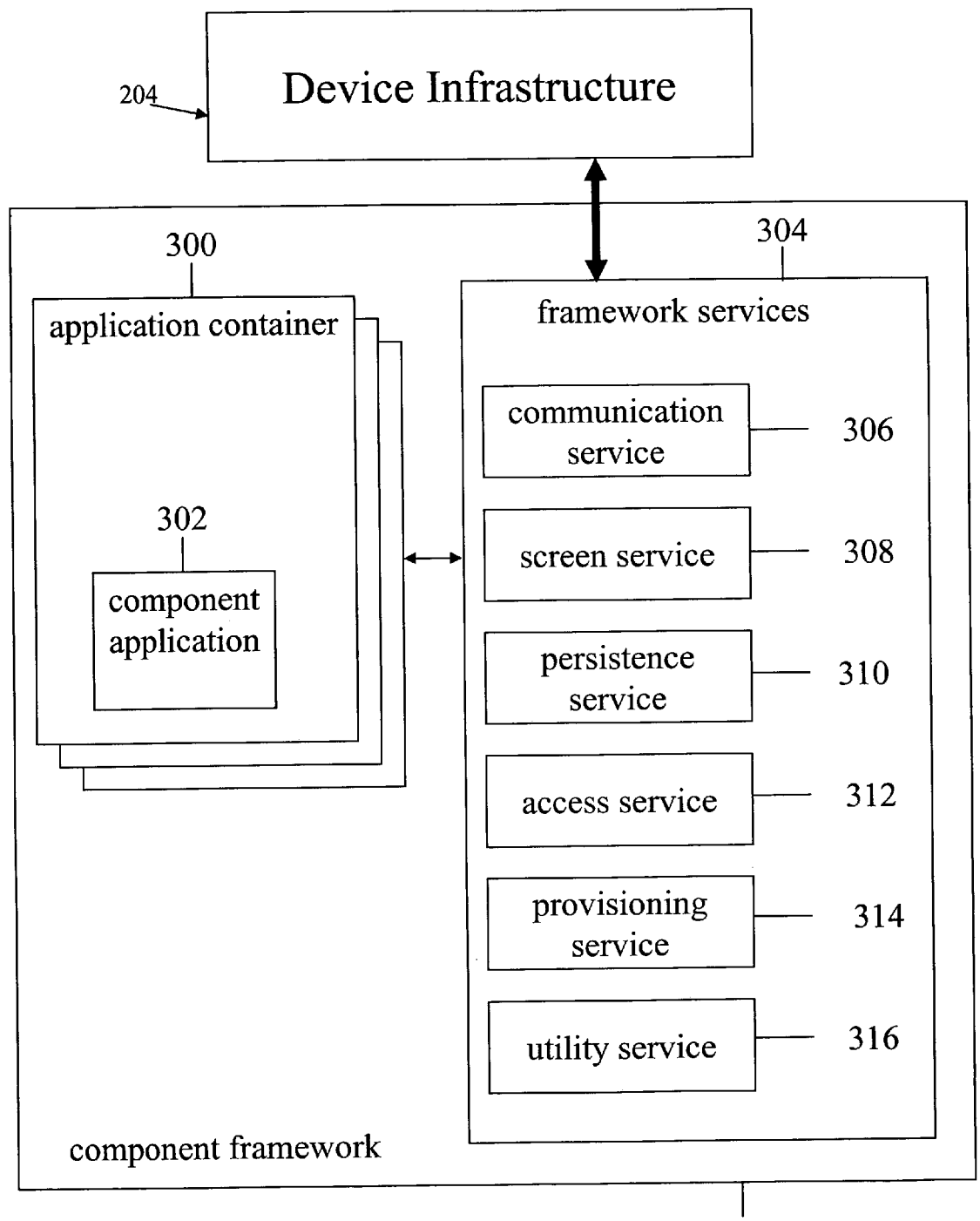
FIG. 3 is a block diagram illustrating a component framework.

Referring to FIG. 3 the component framework 206 is illustrated in greater detail. The component application program 302 comprises components that are executed by the runtime environment 216. The runtime environment 216 creates an application container 300 for each component of the component application program 302. The application container 300 loads the components of the application program 302 and creates executable metadata, which is executed by the processor 208. The component framework 206 therefore provides the host application containers 300 for provisioning the definitions of the components to create the actual web client specific for each respective device infrastructure 204 of the communication devices 102. The application container can provision the component application 302 as per the template-based native execution and metadata-based execution models as described above.

Further, the component framework 206 can also provide framework services 304 to the runtime environment 216 for facilitating implementation of the components of the component application program 302. The component application program 302 is in communications with the application container 300, which coordinates communications 216 with the framework services 304, as needed. The framework services 304 of the component framework 206 coordinate communications via the connection 220 with the device infrastructure 204. Accordingly, access to the device infrastructure 204, user interface 202 and network interface 200 is provided to the component application programs 302 by the component framework 206. In addition, the component application programs 302 can be suitably virus-resistant, since the application containers 300 can control and validate all access of the communications of the component framework 206 to and from the client application programs 302. It is recognized that a portion of the operating system of the device infrastructure 204 can represent the application container 300.

Figure 4:
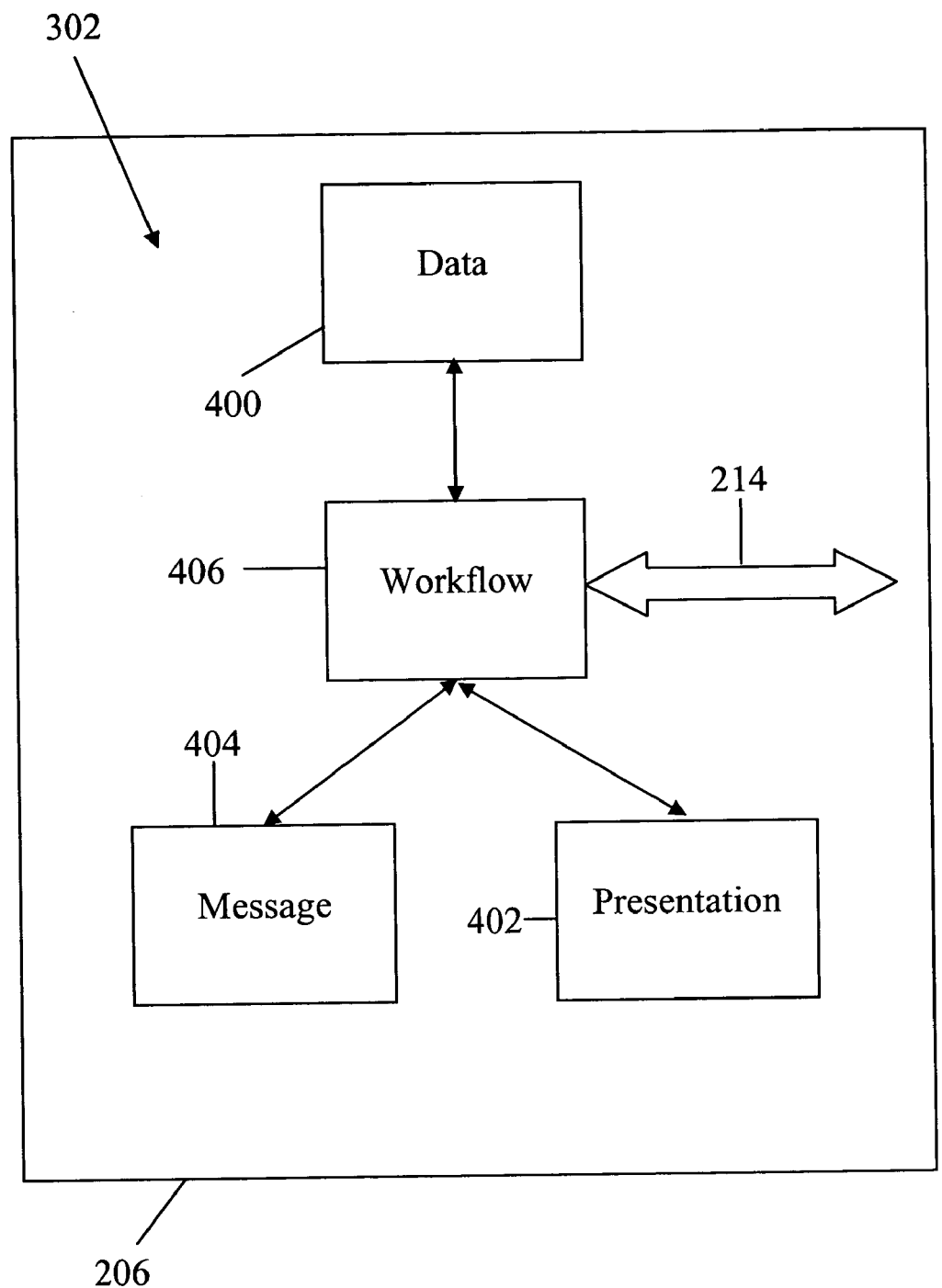
FIG. 4 is a block diagram illustrating a component application.

Referring to FIG. 4, a block diagram of the component application program 302 comprises data components 400, presentation components 402 and message components 404, which are coordinated by workflow components 406 through communications with the application container 300. The structured definition language can be used to construct the components 400, 402, 404 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the components 400, 402, 404 to be processed by the device infrastructure 204 (see FIG. 2), and encoding schemes include such as but not limited to XML, HTML, XHTML, XSML, RDF, Machine Readable Cataloging (MARC), and Multipurpose Internet Mail Extensions (MIME).

The data components 400 define data entities which are used by the component application program 302. Examples of data entities include are orders, users, and financial transactions. Data components 400 define what information is required to describe the data entities, and in what format the information is expressed. For example, the data component 400 may define an order comprising a unique identifier for the order which is formatted as a number, a list of items which are formatted as strings, the time the order was created which has a date-time format, the status of the order which is formatted as a string, and a user who placed the order which is formatted according to the definition of another one of the data components 400. Since data elements are usually transferred by message, there is often persistence of data components 400 in a database. Data components 400 may be dynamically generated or defined by the application designer.

The message components 404 define the format of messages used by the component application program 302 to communicate with external systems such as the web service. For example, one of the message components 404 may describe such as but not limited to a message for placing an order which includes the unique identifier for the order, the status of the order, and notes associated with the order. Message component 404 definitions written in the structured definition language can uniquely represent and map to WSDL messages, and can be generated dynamically at runtime. Accordingly, the dynamic generation can be done for the component definitions for client application messages, and associated data content, from standard Web Service metadata in the definition language used to express the web service interface, such as for example WSDL and BPEL. Web Services messages are defined within the context of operation and there is defined correlations between the message components 404 in the component application program 302 definition. This correlation could be done using predefined message parameters and/or through separate workflow components 406, as further defined below.

The presentation components 402 define the appearance and behaviour of the component application program 302 as it displayed by the user interface 202. The presentation components 402 can specify GUI screens and controls, and actions to be executed when the user interacts with the component application 302 using the user interface 202. For example, the presentation components 402 may define screens, labels, edit boxes, buttons and menus, and actions to be taken when the user types in an edit box or pushes a button. The majority of Web Service consumers use a visual presentation of Web Service operation results, and therefore provide the runtime environment on their devices 100 capable of displaying user interface screens.

It is recognized that in the above described client component application program 302 definitions hosting model, the presentation components 402 may vary depending on the client platform and environment of the device 100. For example, in some cases Web Service consumers do not require a visual presentation. The application definition of the components 400, 402, 404, 406 of the component application program 302 can be hosted in a Web Service registry in a metadata repository 700 as a bundle of platform-neutral data 400, message 404, workflow 406 component descriptors with a set of platform-specific presentation component 402 descriptors for various predefined client runtimes (i.e. specific component frameworks 206—see FIG. 2). When the discovery or installation request message is issued the client type should be specified as a part of this request message. In order not to duplicate data, message, and workflow metadata while packaging component application programs 302 for different client platforms of the devices 102, application definitions can be hosted on the application server 108, for example, as a bundle of platform-neutral component definitions linked with different sets of presentation components 403a, 403b, 403c, representing the different supported user interfaces 202 of the devices 102. It is also recognized that a standard presentation component 402 can be used in the event the specific device 102 is not explicitly supported, thereby providing at least a reduced set of presentation features. When a user makes a discovery or download request message, the client runtime type of the devices 102 is validated and the proper bundle is constructed for delivery by the web server 106 to the device 102 over the network 104. For those Web Service consumers, the client application programs 302 could contain selected presentation components 403a,b,c linked with the data 400 and message 404 components through the workflow components 406, thereby providing a customized component application 302.

The workflow components 406 of the component application program 302 define processing that occurs when an action is to be performed, such as an action specified by a presentation component 402 as described above, or an action to be performed when messages arrive. Presentation workflow and message processing are defined by the workflow components 406. The workflow components 406 are written as a series of instructions in either metadata or a programming language or a scripting language, such as European Computer Manufacturers Association (ECMA) Script, and can be compiled into native code and executed by the application container 300, as described above. An example of the workflow components 406 may be to assign values to data, manipulate screens, or send the message. The workflow component 406 supports a correlation between the messages and defines application flow as a set of rules for operations on the other components 400, 402, 404.

Some other examples of script languages include Perl, Rexx, VBScript, JavaScript, and Tcl/Tk. The scripting languages, in general, are instructional languages that are used to manipulate, customize, and automate the facilities of an existing system, such as the devices 102. In such systems, useful functionality is already available through the user interface 202 (see FIG. 2), and the scripting language is a mechanism for exposing that functionality to program control. In this way, the device 102 is said to provide the host runtime environment of objects and facilities which completes the capabilities of the scripting language.

Referring again to FIG. 3, the components 400, 402, 404, 406 of the application program 302, once provisioned on the communication device 102, are given access to the predefined set of framework services 304 by the application containers 300 of the component framework 206. The framework services 304 include a communication service 306, a presentation service 308, a persistence service 310, an access service 312, a provisioning service 314 and a utility service 316. The communication service 306 manages communication between the component application programs 302 and external resources. The presentation service 308 manages the representation of the component application programs 302 as they are output on the output device of the user interface 202 (see FIG. 2). The persistence service 310 allows the component application programs 302 to store data in the memory module 210 (see FIG. 2) of the device infrastructure 204. The access service 312 provides the component application programs 302 access to other software applications which are present on the communication device 102. The provisioning service 314 manages the provisioning of software applications on the communication device 102. Application provisioning can include requesting and receiving new and updated component application programs 302, configuring component application programs 302 for access to services which are accessible via the network 104, modifying the configuration of component application programs 302 and services, and removing component application programs 302 and services. The utility service 316 is used to accomplish a variety of common tasks, such as performing data manipulation in the conversion of strings to different formats.

It is recognized that the framework services 304 of the communication device 102 can provide functionality to the component application programs 302, which can include the services described above. As a result, the component application programs 302 can have access to the functionality of the communication device 102 without having to implement it. Unlike ordinary applications where all service requests or service API calls are programmed by developers in the native code, the component definitions 400, 402, 404 and workflow 406 describe service requests using the structured definition language such as XML and the set of instructions such as ECMAScript. The XML provides a non-procedural definition of the application's user interface 202, persistent storage and communications with the Web Service, while the ECMAScript provides the procedural component linkage. The Client runtime environment interprets these definitions 400, 402, 404 into the native calls to supported services.

The application container 300 can be referred to as a smart host container for the client application program 302, and can be responsible for analyzing message metadata and for updating the representation of the meta-data in the memory module 210.

In the present embodiment, the device runtime provides an intelligent software framework, or container, for providing a set of basic services to manage and execute typical application behaviour, including data storage, messaging, screen navigation and display, as described above.

By introducing the concept of intelligent container with applications defined by metadata, the burden that constitutes the wireless environment complexity is shifted from the application to the intelligent container. Accordingly, the primary complexity left to an application developer to solve is to clearly define a contract between the application and the container in order to insure the desired functionality.

The intelligent container runs metadata-defined applications and maintains its own internal representation of these applications. As such, from the intelligent container's perspective the application is perceived in two formats: Application Definition and Application Internal Representation. These two formats are described below, including details of the device runtime responsibilities for providing efficient metadata based execution models.

The Application Definition is the format used to publish applications externally using a well-defined, standard format that is highly structured and provides clear instructions to the intelligent container as to how the application needs to be executed. The Application Definition includes a set of definitions of the components that collectively comprise an application. These definitions are declarative and are expressed in a well-defined, structured language such as XML, for example. Moreover, in order to define custom, complex application logic it is sometimes required to use scripting language (or code) sequences either embedded in the metadata definition or separately attached thereto.

As previously described, the Application Definition comprises a data definition, a screen definition, a message definition and workflow definition. Examples of these definitions are provided further in the description with reference to FIGS. 6-16, for illustrative purposes only.

The Application Internal Representation is the format of the application inside the intelligent container at runtime. It comprises executable metadata that is built ad-hoc using the Application Definition. Executable metadata comprises the internal representation of all the application components, including their inter-relationships, running inside the intelligent container. Executable metadata is dependent on the intelligent container implementation.

As part of the contract between the application and its intelligent container, the device runtime is responsible for building efficient models from the application component's metadata that comprise the Application Internal Representation. Accordingly, the device runtime constructs a data model, a screen model, and a communication model for each application from the application's metadata.

Referring to FIG. 5, a sample device runtime environment for an application is illustrated by numeral 500. The device runtime environment 500 includes a data manager 502, a screen manager 504, a communication service 506, a user interface (UI) service 508, and a script interpreter 510. The device runtime environment 500 is also in communication with an application store 512 and an external application 514. The application store 512 is a device repository for storing application definitions and application data. The external application 514 is an application operating external to the device via a wired or wireless connection.

The data manager 502 manages a data model 503 of the application as well as application data on behalf of the application.

The data model 503 includes in-memory templates for each data component definition, intelligence about data component relationships and hierarchy as well as persistence, and references to external APIs that need to be notified of data changes. For example, data may be related such that when one variable changes, others need to be updated automatically. Further, different data may require different levels of persistence.

The data manager 502 uses the data model 503 for application data manipulation, including creation, updates, deletion, as well as data persistence and external data access.

The screen manager 504 is a service for managing a screen model 505. The screen model 505 includes in-memory templates for each screen component definition and an intelligence model for handling UI events as well as navigating and rendering screens built exclusively from declarative actions defined in the screen component. The screen model 505 further includes references to incoming messages that trigger an automatic screen refresh and references to script sequences used in UI Event handling and conditional controls. The screen model 505 manages a screen representation 509, which is displayed to the user.

The screen manager 504 handles modeling of conditional controls and layouts, and continuously updates the screen model 505 based on events received from the UI service 508. The screen manager 504 uses the screen model 505 to render the appearance of the application screen, establish screen navigation paths and process UI events.

The UI service 508 provides the visualization of the screen representation in the native UI framework of the device. The UI service 508 also communicates user events to the screen manager 504.

The communication service 506 manages a communication model 507 of the application and handles all application communication and message processing. Due to the nature of wireless applications, the communication model 507 used in present embodiment is asynchronous. The communication model 507 includes in-memory templates for each message definition including message hierarchy. The communication model 507 further includes intelligence regarding message mapping to data components or data fields, message security and reliability, and references to script sequences that handle incoming messages. Accordingly, the communication model 507 describes a set of messages that the application initiates or is capable of receiving and processing.

The communication service 506 uses the communication model 507 to enable an application's communication needs with other wireless or wired applications, whether they are located on the device or externally.

The script interpreter 510 executes script portions of the application, for example ECMAScript and the like. The script interpreter 510 and has the ability to manipulate the screen model 505 through interaction with the screen manager 504, the data model 503 through interaction with the data manager 502, and the communication model 507 through interaction with the communication manager 506.

The operation of the device runtime is described generally as follows. The device runtime is presented with the Application Definition when the application is uploaded onto the device. The device runtime could either construct the Application Internal Representation at that time or delay this operation until receiving a request to execute the application. Accordingly, the device runtime can host an application in "raw" format, that is Application Definition, or in "executable" format, that is Application Internal Representation.

Accordingly, it can be seen that the device runtime executes template based generic code built from the metadata definition of the components rather than executable code of a pre-compiled wireless application.

Further, the device runtime can execute in a mixed execution mode. In the mixed execution mode, the device runtime provides the ability to switch between an execution mode and an interpreted mode.

In the execution mode the device runtime provides an execution environment to run both the Application Internal Representation and specific script instructions in the native code. As described above, the Application Internal Representation, in the form of executable metadata, is built ad-hoc from the Application Definition. Further, associated script instructions are redirected from the script interpreter using global symbols libraries. That is, proxy execution is performed of predefined global symbols in the script to the native environment.

Further, the device runtime can switch to the interpreted mode in order to execute more complex functionality. That is, the runtime switches to interpreted mode to run scripts when executing application metadata is not enough to achieve desired complexity. FIGS. 6-23, described below, provide several examples of component definitions and logic flow described either exclusively though metadata or by script.

Referring to FIG. 6, a sample XML portion of a data definition of the Application Definition is illustrated generally by numeral 600. The data definition describes the data components that the application uses, including their persistence mechanism. Data components may contain primitive fields or may refer to other data components, which are also defined therein. In the example illustrated in FIG. 6, the data component shown is named "Race" and requires persistence. The data component includes several fields of varying types and complexity. For example, the field name "description" is a string, whereas the field name "horses" acts as a reference to another component named "Horse".

Referring to FIG. 7, a sample XML portion of a screen definition of the Application Definition is illustrated generally by numeral 700. The screen definitions describe all application screens, their associated layouts, menu items, controls and screen rendering metadata. In this particular example, the name of the screen component is "scrLogin" and the title is "Login". The screen component has a data component "Player" as a parameter and does not represent a dialog box. The screen component includes two labels and two edit boxes.

The first label is named "ebPlayerNamelbl" and has a text value "Player Name:". The first label is associated with the first edit box, which is named "ebPlayerName" and has a value associated with the "name" attribute of the parameter "Player". This edit box allows the user to input a player name.

Similarly, the second label is named "ebPlayerCodeNamelbl" and has a text value "Player Code:" The second label is associated with the second edit box, which is named "ebPlayerCode" and has a value associated with the "code" attribute of the parameter "Player". This edit box allows the user to input a code, or password, associated with the player name. Both of the edit boxes have a readOnly value set to false, which allows the user to input data.

The screen component further includes three menu items. The first menu item is named "regPlayer" and has a corresponding label "Register New Player". This menu item allows the user to navigate to a screen component named "scrRegisterNewPlayer" for registering a new player.

The second menu item is named "loginPlayer" and has a corresponding label "Login". This menu item allows the user to login to the application by accessing a pblock "2". In the present embodiments, a pblock is a reusable piece of "workflow" code tat is described either declaratively by metadata, or by script. Pblock "2" describes the workflow associated with a user login.

The second menu item is named "logout" and has a corresponding label "Logout". This menu item allows the user to logout of the application by accessing a pblock "3". In the present example, pblock "3" describes the workflow associated with a user logout.

As can be seen, terms such as layout, menu, label, edit, name, value, readOnly, action and condition are understood by the runtime environment and detailed programming need not be provided by the programmer in order to achieve the desired functionality.

Referring to FIG. 8, a sample XML portion of a message definition of the Application Definition is illustrated generally by numeral 800. Messages are either inbound or outbound and comprise a list of primitive or complex fields. The present example illustrates the definition of an incoming message named "inViewingReq". Each message field describes the type of data expected as part of the message and maps the data to local application components, where applicable. For example, the message will have a field name "requestor". The data associated with that field name is mapped to the field "name" in the component "Agent".

Further, the application logic of the Application Definition may be expressed declaratively through metadata exclusively. Application Logic includes data manipulation, screen rendering for dynamic screens, UI event processing and declarative message processing.

FIGS. 9a-c illustrate some examples of declarative data manipulation, including mapping data to intelligent UI controls, passing data as parameters to screens or script sequences and mapping messages to data.

Referring to FIG. 9a, an example of mapping data to intelligent UI controls is shown generally by numeral 900. UI controls are bound through declarative statements to the data components that they are displaying or are associated with. When a UI control's value changes the underlying data may change or vice versa. In this example, the user is presented with radio button that is named "chClients". This particular radio button is mapped to a component named Client. Therefore, when the user changes the input, the data mapped to the input changes.

Referring to FIG. 9b, an example of passing data as parameters to screens or script sequences is shown generally by numeral 930. As previous described with reference to FIG. 7, the data component "Player" is passed to the screen as a parameter. Generally, passing data as parameters to screens, to script sequences or to data components that are automatically mapped to messages are all contenders for declarative action.

Referring to FIG. 9c, an example of mapping messages to data is shown generally by numeral 960. In the present example, when an incoming message has the name "in PropertyInfo", it is mapped to a data component named "PropertyInfo". When a message definition maps directly to data, the device runtime has a predefined instruction that upon receipt of such a message it updates or creates data automatically, without requiring additional processing.

Referring to FIG. 10 an example of declarative screen rendering for a dynamic screen is shown generally by numeral 1000. Conditional controls, those are controls whose value and appearance can change dynamically, are specified declaratively. In the present example, "Canada" and "USA" are possible choices for a user. Depending on the user's selection, the screen is dynamically rendered to display either Canada's provinces or the United States of America's states as a subsequent choice for the user. Using conditional controls defined by metadata, the appearance and behavior of the screen is deferred to runtime criteria managed by the device runtime.

Referring to FIG. 11 an example of declarative UI event processing is shown generally by numeral 1100. In the present example screen navigation as a result of a user event is specified declaratively. As a result of menu item "Client Details" being selected, the screen manager of the device runtime is instructed to render the next screen, "scrClientInfo". Similarly, if menu item "Client Workbook" is selected, the screen manager of the device runtime is instructed to render the next screen, "scrClientWrbk" and if menu item "New Client" is selected, the screen manager of the device runtime is instructed to render the next screen, "scrNewClient".

FIGS. 12a and 12b illustrate examples of declarative message processing. In these examples, inbound message processing that results in data updating and screen refreshing are shown.

Referring to FIG. 12a, an example of a declarative data update is illustrated generally by numeral 1200. Fields in an incoming message are mapped directly to corresponding data. When the device receives such a message, the device runtime automatically updates the data without requiring additional instruction. In the present example, if a message titled "inMyListing" is received, a message field titled "forClient" is automatically mapped to attribute "name" of data component "Client".

Referring to FIG. 12b, a declarative screen refresh is illustrated generally by numeral 1250. In the present example, the screen is refreshed upon receipt of a message. Therefore, data changes affected by the messages can be indicated to the user. In the present embodiment, the screen is refreshed upon receipt of messages "in PropertyInfo" and "inPropertyStatusChange".

The declarative sample screens described above are a few examples where metadata can play an important role in describing application logic. Other examples will be apparent to a person of ordinary skill in the art. Accordingly, the device runtime may be able to transform an entire application to executable metadata for execution.

When application logic is more complex than the metadata can handle, the application definition uses script sequences either embedded in the component metadata or defined separately from the component metadata for reuse. The following are several examples of implementing application logic by script.

Referring to FIG. 13, an example of script for data manipulation is illustrated generally by numeral 1300. The script in the present example amends data in accordance with passed parameter "propertyinfo". The attributes "propID", "status", and "price" of component "outPropertyStatusChange" are updated with the corresponding attributes of the passed parameter "propertyinfo".

Referring to FIG. 14, an example of script for screen rendering is illustrated generally by numeral 1400. The script in the present example renders different elements on the screen in accordance with passed parameters "race", "horse", and "bet". If the "bet" parameter is not null then appropriate properties on the screen are rendered using the corresponding properties of the "bet" parameter. If the "bet" parameter is null, then appropriate properties on the screen are rendered using corresponding attributes of the "race" and "horse" parameters.

Figure 15:

Referring to FIG. 15, an example of screen navigation effected by script is illustrated generally by numeral 1500. In the present example, the screen rendering includes a button named "btnDone". If the user clicks on this button the script named "ahStatusChange" illustrated in FIG. 13 is implemented. In addition to data rendering, as previously described, the script in FIG. 13 renders screen component "scrPropDetails" using the data of parameter "propertyInfo".

Additionally, FIGS. 15 and 13 illustrate an example of message sending effected by script. Prior to rendering the screen component "scrPropDetails" as described above, a message related to component "outPropertyStatusChange" is sent.

Referring to FIG. 16, an example of message processing by script is illustrated generally by numeral 1600. In the present example, data in an incoming message is manipulated by the script and stored in an associated data component. If no data is present in the received message, the script causes a message box to be displayed to the user.

The script sample screens described above are a few examples where script can play an important role in describing application logic. Other examples will be apparent to a person of ordinary skill in the art.

Figure 17:
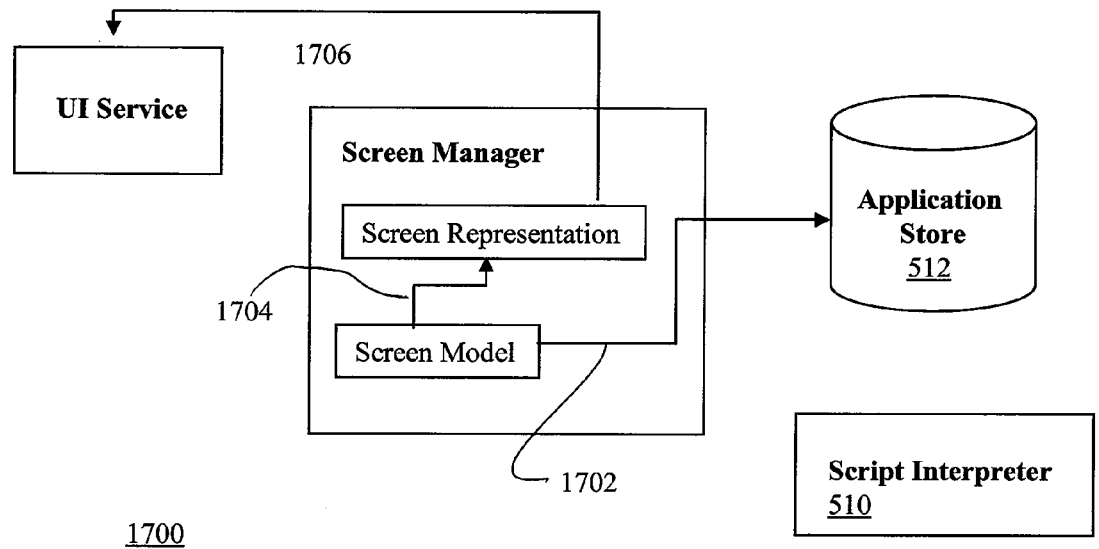
FIGS. 17 to 23 are block diagrams illustrating runtime flow for several application scenarios.

The following describes several device runtime flows illustrating mixed mode operation in accordance with the present embodiment. Referring to FIG. 17 a method for performing an initial screen loading is shown generally by numeral 1700. In step 1702 application screens are extracted from the application store 512 as either pre-digested application metadata or XML. In step 1704 a screen internal representation, or screen model 505, is produced. In step 1706 the screen model 505 produces a current screen representation 509, including all field values and settings that reflect the current state of screen conditions and passes it to the UI service 508 for visualization.

Figure 18:
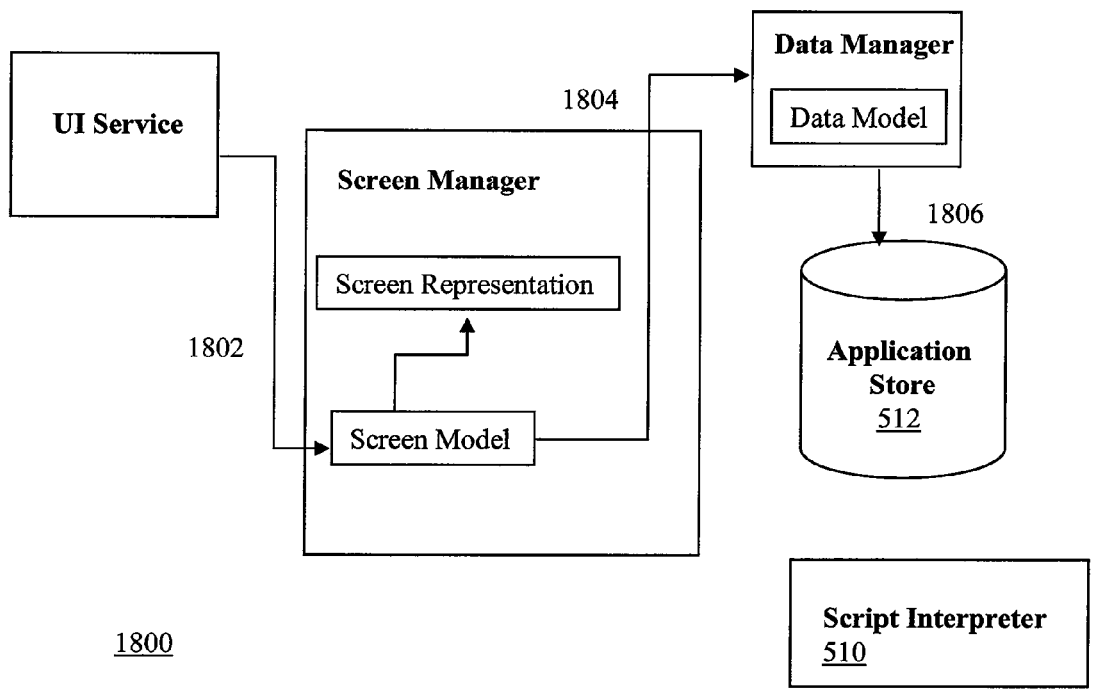

Referring to FIG. 18 a method for performing a UI initiated data change that is declaratively defined is illustrated generally by numeral 1800. In step 1802, a UI change, triggered by a user changing an edit control, is communicated to the screen model 505. In step 1804, an underlying data component mapped to the edit control has its value changed in the data model 503. Concurrently, in step 1805, the data change is updated in the screen representation 509. In step 1806, the data change is persisted in the application store 512.

Figure 19:
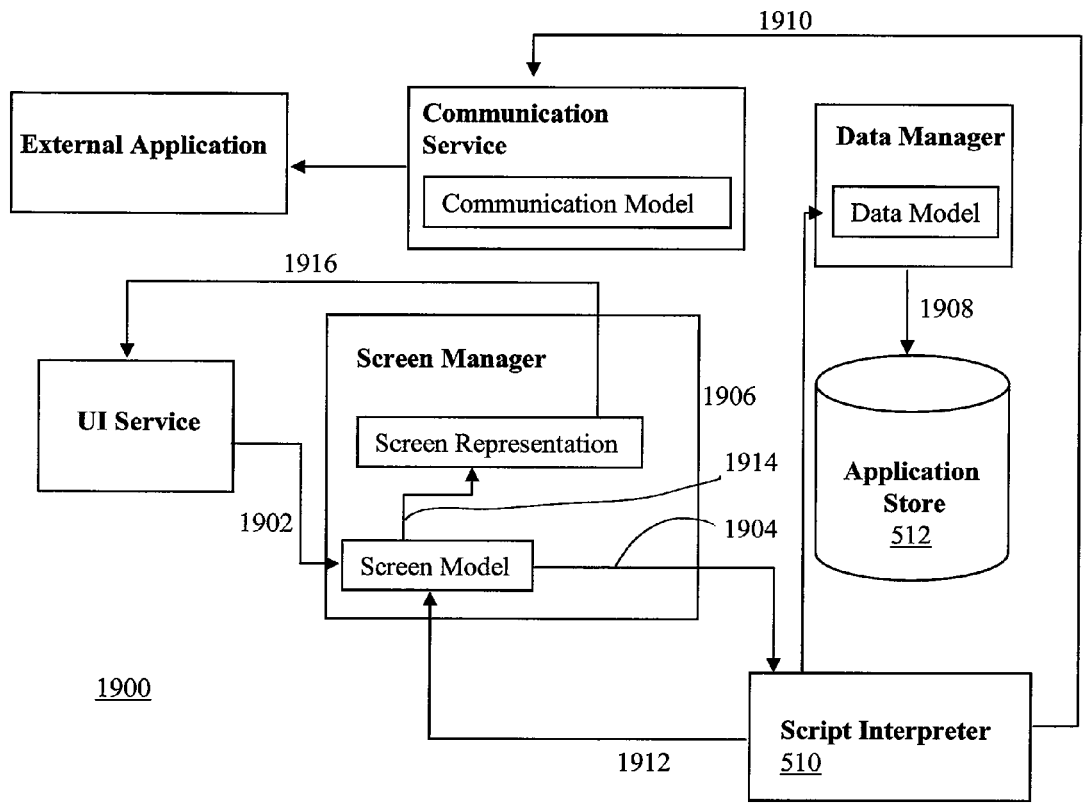

Referring to FIG. 19 a method for performing a UI initiated data change that is defined by script is illustrated generally by numeral 1900. In the present example, in addition to modifying the data, the UI initiated change generates an outgoing message.

In step 1902 a UI change triggered by a user changing an edit control is communicated to the screen model 505. The screen model 505 validates the nature of the event over the internal screen metadata representation and detects any driving or dependent controls affected as a result of the UI event by virtue of any conditional control relationships specified entirely through application XML. In step 1904, the screen model detects that the UI change requires script processing and invokes the script interpreter 510. In step 1906, the script interpreter 510 modifies the data model 503 in accordance with the interpreted script. In step 1908, the data change is persisted the application store 512.

Since the script executed as a result of the UI change generates an outgoing message, in step 1910, the script interpreter 510 generates an outbound message and communicates that message to the communication model 509. The communication model 507 transmits the message to an external application 514 as required.

In step 1912, the script interpreter 510 modifies the screen model 505 as specified in the script. In turn, at step 1914, the screen model produces an updated screen representation 509, which is passed to the UI Service 508 in step 1916 for visualization.

Figure 20:
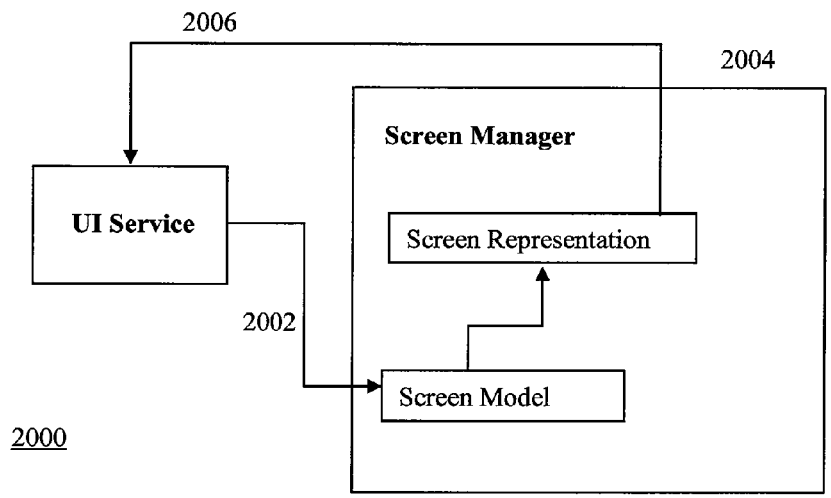

Referring to FIG. 20, a method for performing screen navigation that is declaratively defined is illustrated generally by numeral 2000. In step 2002, user interaction results in a change in the UI. Accordingly, a UI event is communicated to the screen model 505. In step 2004, the screen model 505 detects by means of executable metadata that this is a screen navigation event and generates the screen representation of the new screen to be displayed. In step 2006, the screen representation is passed to the UI service 508 for visualization.

Figure 21:
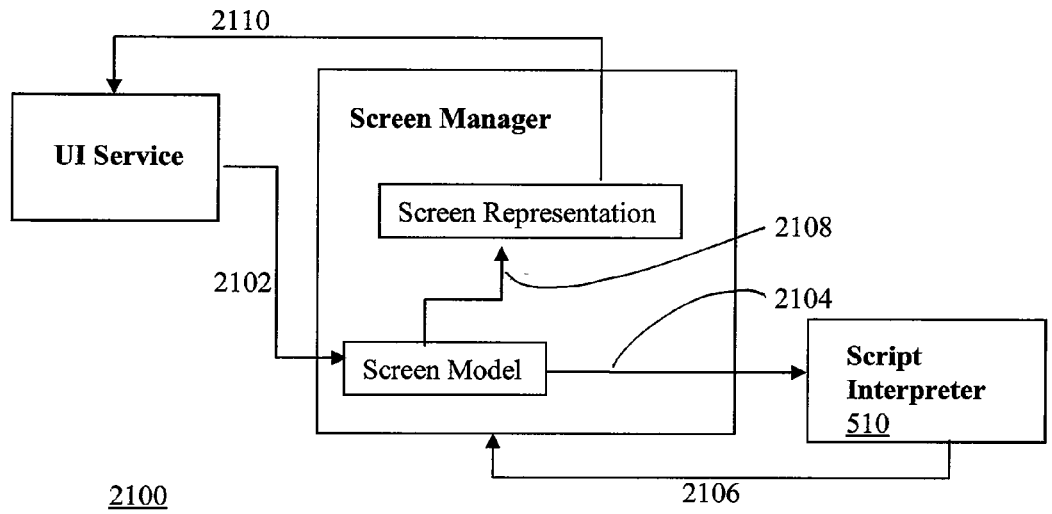

Referring to FIG. 21, a method for performing screen navigation that is defined by script is illustrated generally by numeral 2100. In step 2102, user interaction results in a change in the UI. Accordingly, a UI event is communicated to the screen model 505. In step 2104, the screen model determines that UI event relates to a script call and passes control to the script interpreter 510. In step 2106, the script interpreter 510 executes the script, which instructs the screen model 505 to produce a new screen representation. In step 2108, the screen model 505 produces the new screen representation 509 as required by script interpreter 510. In step 2110, the screen representation 509 is passed to the UI Service 510 for visualization.

Figure 22:
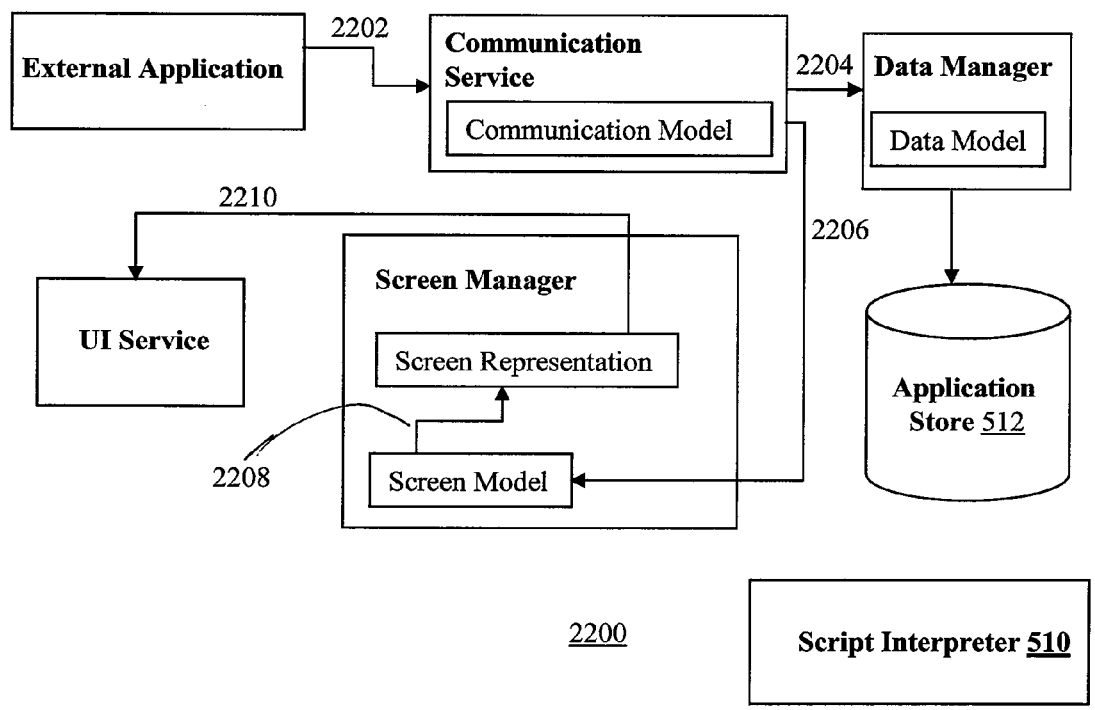

Referring to FIG. 22, a method for modifying data and updating the UI in accordance with a received message that is declaratively defined is illustrated generally by numeral 2200. In step 2202, the communication service 506 receives an inbound message from an external application 514. In step 2204, the communication service 506 determines that the message is mapped to data so it passes control to the data manager 502. The data manager 502 updates the data model 503 and persists the new data in the application store 512.

In step 2206, the communication service 506 triggers an update, or screen refresh, for the screen model 505. In step 2208, the screen model 505 produces a new screen representation 509. In step 2210, the screen representation 509 is passed to the UI service 508 for visualization.

Figure 23:
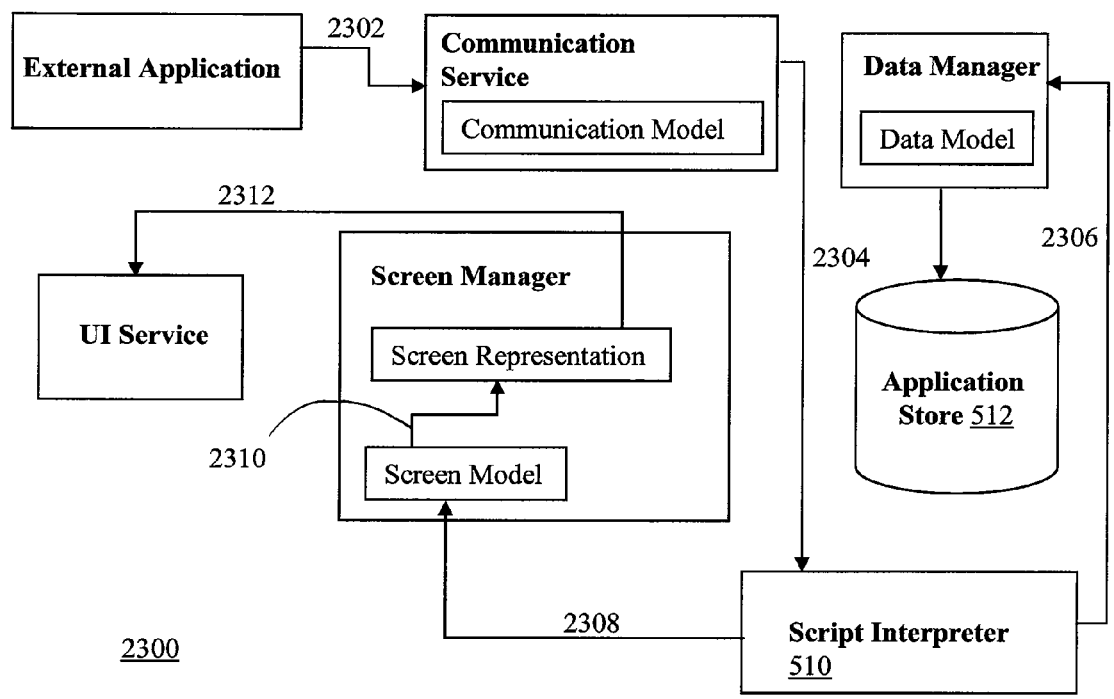

Referring to FIG. 23, a method for modifying data and updating the UI in accordance with a received message that is defined by script is illustrated generally by numeral 2300. In step 2302, the communication service 506 receives an inbound message from an external application 514. In step 2304, the communication service 506 determines that the message is to be handled by script so it passes control to the script interpreter 510, which executes the script to process message.

In step 2306, the script interpreter updates the data model 503 as required by the interpreted script and persists the new data in the application store 512. In step 2308, the script interpreter modifies the screen model 505 as specified by the script. In step 2310, the screen model 505 produces a new screen representation 509. In step 2312, the screen representation 509 is passed to the UI service 508 for visualization.

Accordingly, it can be seen that providing the device runtime with a larger responsibility for executing the application not only permits applications to be written in component format, as described herein, but also facilitates mixed mode execution. Therefore, when an application requires complex functionality that cannot be achieved solely by running executable metadata, the application can use script components, thus switching to interpreted mode. The script interpreter then communicates the resulting executable metadata to the corresponding component model for execution.

Although preferred embodiments of the invention have been described herein, it will be understood by those skilled in the art that variations may be made thereto without departing from the spirit of the invention or the scope of the appended claims.

What is claimed is:

1. A computing device having a processor configured to execute a device runtime environment for providing an intelligent container to a component application at runtime, the component application capable of execution at least partly in each of a natively compiled mode and an interpreted mode, the component application further comprising a plurality of components comprising:
   at least one of a data component described in data component definitions expressed in a structured definition language, the data components defining data entities used by the component application,
   a message component having corresponding component definitions in a structured definition language, the message components defining formats of messages used by the component application; and
   a screen component having corresponding component definitions in a structured definition language, the screen components defining the appearance and behaviour of the component application,
   a workflow component comprising a series of instructions providing a correlation between the messages and defines application flow as a set of rules for operations on the data, message and screen components,
   the intelligent container comprising an application internal representation of the component application, comprising executable metadata, the application internal representation built by the device runtime environment using the application component definitions and comprising:
      a data model comprising templates for each data component of the component application, intelligence about data component relationships and hierarchy as well as persistence, and references to external APIs that need to be notified of data changes;
      a screen model comprising templates for each screen component of the component application and intelligence for handling UI events, navigating and rendering screens; and
      a communication model comprising templates for each message, intelligence for message mapping to one or more of the application components or data components, and references to script sequences that handle incoming messages;
   the computing device comprising a computer memory in communication with the processor to execute to execute the device runtime environment comprising a plurality of services in communication with each other to manage and execute the application behaviour, the plurality of service comprising:
      a data manager for managing the data model of the component application;
      a screen manager for rendering the appearance of the component application using a screen model for display on a screen of the computing device;
      a communication service for sending messages to external resources and receiving and managing messages sent from external resources in accordance with the communication model; and
      a script interpreter for executing script portions of the component application written in a workflow component of the component application.

2. The computing device of claim 1 further comprising a user interface module for managing communication between a user interface and at least one of the services.

3. A computer implemented method in a processor of a computing device for executing a component application the computing device comprising: a data manager, a screen manager, a communication service and a script interpreter, the component application comprising:
   at least a screen component described in a screen component definition expressed in a structured definition language, the screen component defining the appearance and behaviour of the component application,
   a data component described in a data component definition expressed in the structured definition language, the data component defining data entities used by the component application;
   a message component in a message component definitions expressed in the structured definition language the message component defining formats of messages used by the component application; and
   a workflow component comprising a series of instructions providing a correlation between the messages and defines application flow as a set of rules for operations on the data, message and screen components;
   the method comprising:
      creating an application internal representation of the component application comprising executable metadata of the screen component, data component and message component, the application internal representation comprising a data model, a screen model and a communication model;
      executing the component application using the data, screen and communication models of the application internal representation, in the device runtime environment comprising:
      managing the data model of the component application using a data manager;
      rendering the appearance of the component application based on the screen model using a screen manager; and
      sending messages to external resources and receiving and managing messages sent from external resources in accordance with the communication model, using a communication service;
      dynamically interpreting the information during execution of the application using the script interpreter for information from the workflow component that could not be put into executable metadata of the application internal representation; and
      distributing output from the script interpreter to the screen manager, data manager and communication service.

* * * * *